(12) United States Patent
Koseki et al.

(10) Patent No.: US 6,807,946 B2
(45) Date of Patent: Oct. 26, 2004

(54) FUEL SUPPLY DEVICE FOR INTERNAL COMBUSTION ENGINE

(75) Inventors: Yukio Koseki, Susono (JP); Keiso Takeda, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 20 days.

(21) Appl. No.: 10/316,850

(22) Filed: Dec. 12, 2002

(65) Prior Publication Data

US 2003/0116137 A1 Jun. 26, 2003

(30) Foreign Application Priority Data

Dec. 25, 2001 (JP) ........................................ 2001-391994
Dec. 25, 2001 (JP) ........................................ 2001-392008

(51) Int. Cl.[7] ............................................... F02M 37/04
(52) U.S. Cl. ...................................... 123/470; 123/468
(58) Field of Search ............................. 123/470, 467, 123/468, 469, 456, 447, 295, 430

(56) References Cited

U.S. PATENT DOCUMENTS

| | | | | |
|---|---|---|---|---|
| 3,125,078 A | * | 3/1964 | Reiners | 123/468 |
| 3,845,748 A | * | 11/1974 | Eisenberg | 123/468 |
| 3,924,583 A | * | 12/1975 | Jardin | 123/470 |
| 4,485,790 A | * | 12/1984 | Nishimura et al. | 123/468 |
| 5,299,542 A | | 4/1994 | Hafner | |
| 5,687,696 A | * | 11/1997 | Takagi et al. | 123/516 |
| 6,135,091 A | * | 10/2000 | Itoh et al. | 123/456 |
| 6,199,539 B1 | * | 3/2001 | Pearlman et al. | 123/470 |
| 6,234,135 B1 | | 5/2001 | Lindblom | |
| 6,237,569 B1 | | 5/2001 | Stelzer et al. | |
| 6,279,540 B1 | * | 8/2001 | Greaney et al. | 123/470 |
| 6,622,702 B2 | * | 9/2003 | Yomogida et al. | 123/478 |

FOREIGN PATENT DOCUMENTS

| | | |
|---|---|---|
| DE | 41 28 086 A1 | 2/1993 |
| DE | 197 16 513 C2 | 11/1998 |
| JP | A 8-338339 | 12/1996 |
| JP | A 9-14072 | 1/1997 |
| JP | A 9-60563 | 3/1997 |
| JP | A 9-264227 | 10/1997 |

* cited by examiner

Primary Examiner—Mahmoud Gimie
(74) Attorney, Agent, or Firm—Oliff & Berridge, PLC

(57) ABSTRACT

A fuel supply device for an internal combustion engine having at least one cylinder that is formed in a cylinder block, a fuel injection valve and a fuel passage that supplies fuel to the fuel injection valve, includes a portion of the fuel passage that is formed as a delivery pipe that is embedded in a cylinder head and is joined to an upper portion of the cylinder block. The fuel injection valve is positioned so that it intersects the delivery pipe and receives the supply of fuel from the side at a portion that intersects with the delivery pipe, and a sealing member is positioned at the joint portion between the delivery pipe and the fuel injection valve.

16 Claims, 10 Drawing Sheets

FUEL SUPPLY DEVICE FOR INTERNAL COMBUSTION ENGINE

INCORPORATION BY REFERENCE

The disclosure of Japanese Patent Application No. 2001-392008 filed on Dec. 25, 2001 and No. 2001-391994 filed on Dec. 25, 2001, including the specification, drawings, and abstract are incorporated herein by reference in their entirety.

BACKGROUND OF THE INVENTION

1. Field of Invention

This invention is related to a fuel supply device for an internal combustion engine.

2. Description of Related Art

In an internal combustion engine, a fuel-air mixture is compressed and then ignited (spontaneously ignited in a diesel engine) in a cylinder, and an expanding force of the fuel-air mixture after ignition is output as a driving force. Naturally, fuel needs to be supplied prior to combustion. Currently, fuel is generally supplied by injection to an intake port and by direct injection into the cylinder. Also, in recent years, importance has been placed on considerations toward the environment. Therefore, further improvements in exhaust gas purification performance and further improvements in fuel consumption performance are strongly demanded.

SUMMARY OF THE INVENTION

In various exemplary embodiments the present invention improves exhaust gas purification performance and fuel consumption performance, as well as improvement of exhaust gas purification performance and fuel consumption performance after a cold start and prior to the completion of warm-up.

Thus, it is an object of the invention to provide a fuel supply device for an internal combustion engine that can promote the atomization of the fuel during fuel injection (in particular, during cold start), and further improve exhaust gas purification performance and fuel consumption performance.

In an exemplary embodiment of the invention, a fuel supply device for an internal combustion engine is provided that includes at least one cylinder that is formed in a cylinder block, a cylinder head that is joined to the upper portion of the cylinder block, a fuel injection valve that injects fuel into the cylinder or an intake passage that communicates with the cylinder, a delivery pipe that is embedded in the cylinder and supplies fuel to the fuel injection valve, and a sealing member that is provided in a joint portion of the same delivery pipe and fuel injection valve.

Accordingly, the fuel is heated by the delivery pipe that is embedded in the cylinder head, and the atomization of the fuel after injection is promoted. Thereby, the improvement of each type of performance is realized as a result of reliable combustion.

The provision of a fuel passage in the cylinder head is disclosed in Japanese Patent Laid-Open Publication No. 9-14072. The improvement of exhaust gas purification and fuel consumption by heating the fuel, however, is not the object of the fuel supply device that is disclosed in the publication. Also, matters related to the securing of fluid-tight conditions in a fuel system are not studied in any way.

The present invention improves exhaust gas purification performance and fuel consumption performance, while also securing fluid-tight conditions in the fuel system.

DETAILED DESCRIPTION OF EXEMPLARY EMBODIMENTS

Figure 1:
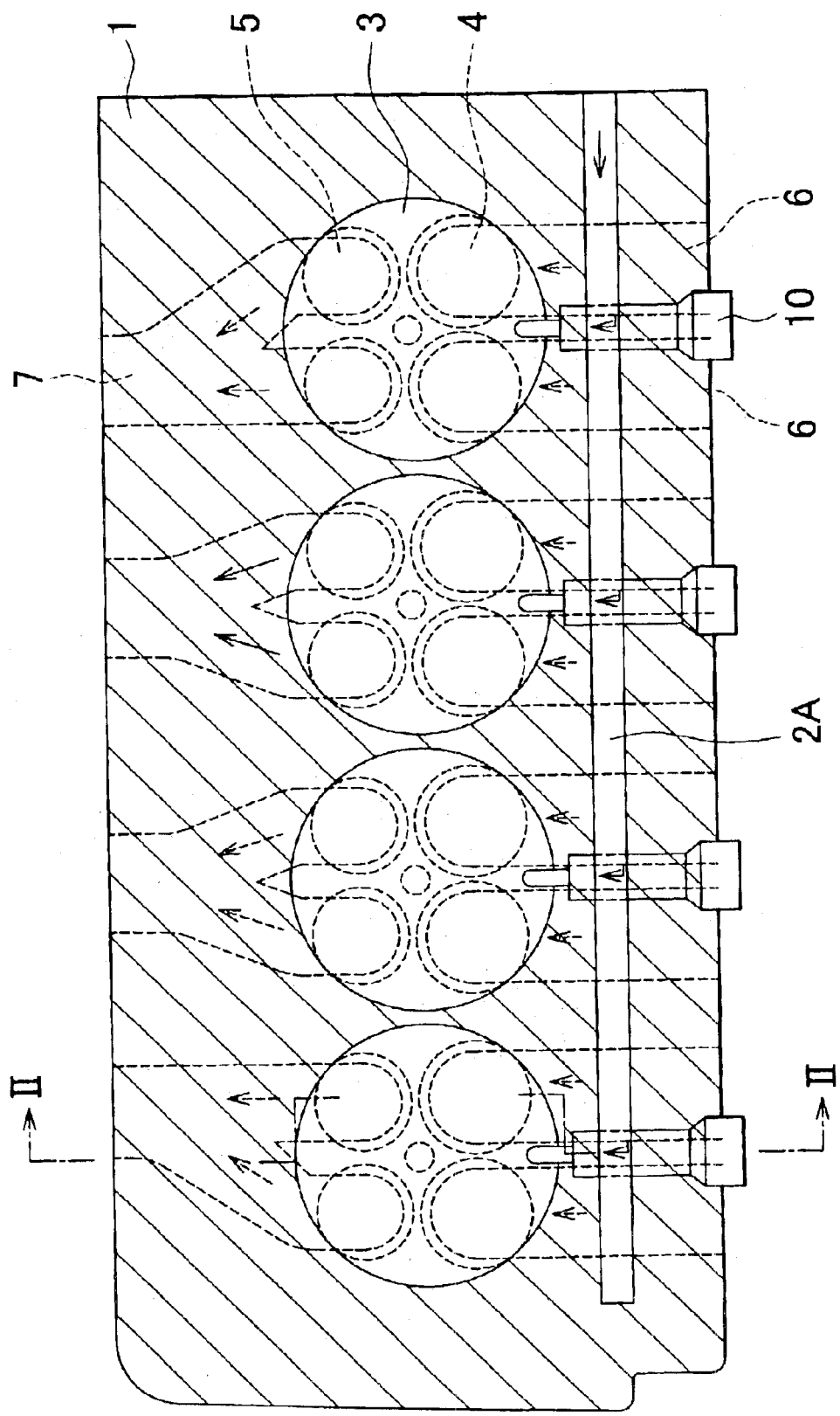
FIG. 1 is a sectional view of a cylinder head of a fuel supply device according to an exemplary embodiment of the invention.
Figure 2:
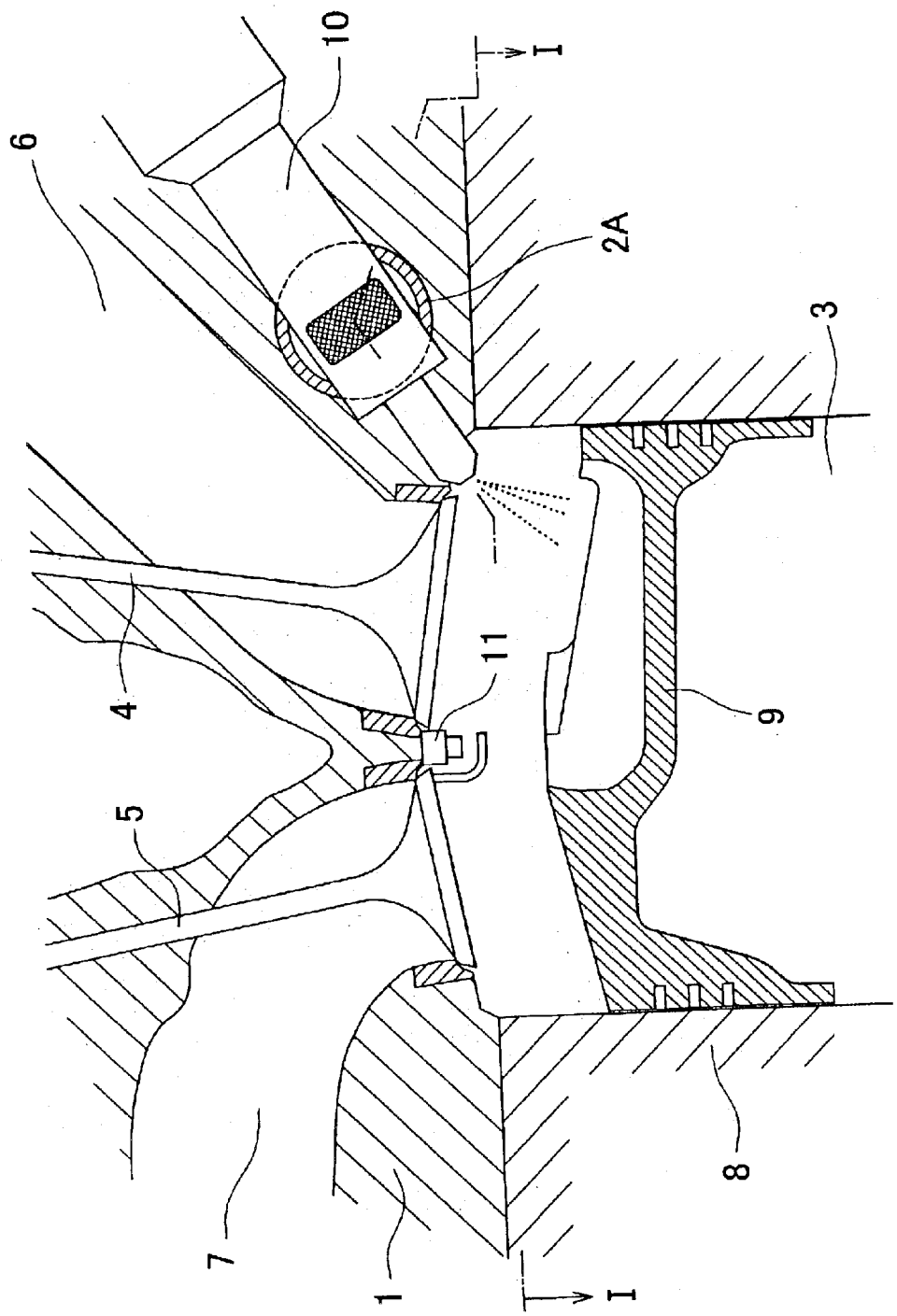
FIG. 2 is a sectional view of a cylinder head of the fuel supply device according to an exemplary embodiment of the invention.

A fuel supply device according to an exemplary embodiment of the invention will be explained below. A sectional view of a portion of a cylinder head 1 of an internal combustion engine (engine) having a fuel supply device in an exemplary embodiment is shown in FIG. 1. FIG. 1 shows a sectional view of the cylinder head 1 in a plane perpendicular to the central axis of a cylinder 3. FIG. 1 is a sectional view taken along line I to I line in FIG. 2. FIG. 2 is a sectional view taken along line II to II in FIG. 1.

In the exemplary embodiment, the engine is an inline four-cylinder engine, and a so-called four-valve engine. Four cylinders 3 are aligned inline, and two intake valves 4 and two exhaust valves 5 are provided for each cylinder 3. The intake valve 4 opens and closes between the cylinder 3 and an intake port 6. Also, the exhaust valve 5 opens and closes between the cylinder 3 and an exhaust port 7. Further, the cylinder 3 is formed in an inner portion of a cylinder block 8 (FIG. 2), and the cylinder head 1 is joined to an upper portion of the cylinder block 8.

For all cylinders 3, the intake valve 4 (intake port 6) is located on the same side, and the lower side in FIG. 1 is an intake passage side of the cylinder 3. Likewise, for all the cylinders 3, the exhaust valve 5 (exhaust valve 7) is located on the same side, and the upper side in FIG. 1 is an exhaust passage side of the cylinder 3. Taking into consideration the tubing of the intake and exhaust passages, it is unrealistic not to match the intake side and the exhaust side for all the cylinders 3 that are inline. For a multibank engine, the intake side and the exhaust side of the cylinder 3 are generally matched for each bank.

As shown in FIG. 2, in the internal portion of the cylinder 3, a piston 9 is housed such that it can reciprocate, the same as with a normal engine. The engine of this exemplary embodiment is an in-cylinder injection type direct injection engine, and an injector (fuel injection valve) 10 that is provided with a fuel injection opening in the cylinder 3 is positioned in the cylinder head 1. One injector 10 is provided for each of the cylinders 3. A recess is formed on an upper surface of the piston 9, and stratified charge combustion, wherein the fuel injected from the injector 10 is collected in the vicinity of a spark plug 11 that is positioned in the center of the two intake valves 4 and the two exhaust valves 5 and ignited, is possible.

As shown in FIG. 1, a delivery pipe 2A that forms a part of the fuel passage is embedded in the cylinder head 1 of this embodiment (hereinafter, the fuel passage 2A in the cylinder head is also referred to as the delivery pipe 2A). The delivery pipe 2A is cast when the cylinder head 1 is cast. An introduction portion of the cylinder head 1 of the delivery pipe 2A and a fuel tank (not shown) are connected by a normal fuel pipe.

The engine in the exemplary embodiment is an in-cylinder direct injection engine. When fuel is injected, it is necessary to inject fuel against the compressed intake air in the cylinder. Therefore, a high-pressure pump is positioned on the fuel pipe upstream of the delivery pipe 2A (or on the upstream end portion of the delivery pipe 2A). Thus, the fuel pressure in the delivery pipe 2A is increased. The rotational drive force of the camshaft is used as the drive source of the high-pressure pump. Also, though not shown in the drawing, a fuel pressure sensor that detects the internal fuel pressure is positioned at the end of the delivery pipe 2A. Furthermore, though also not shown in the drawing, when the fuel pressure in the delivery pipe 2A increases beyond a predetermined value, a return pipe is also provided that makes the fuel in the delivery pipe 2A flow back to the upstream side in order to lower the fuel pressure.

Figure 3:
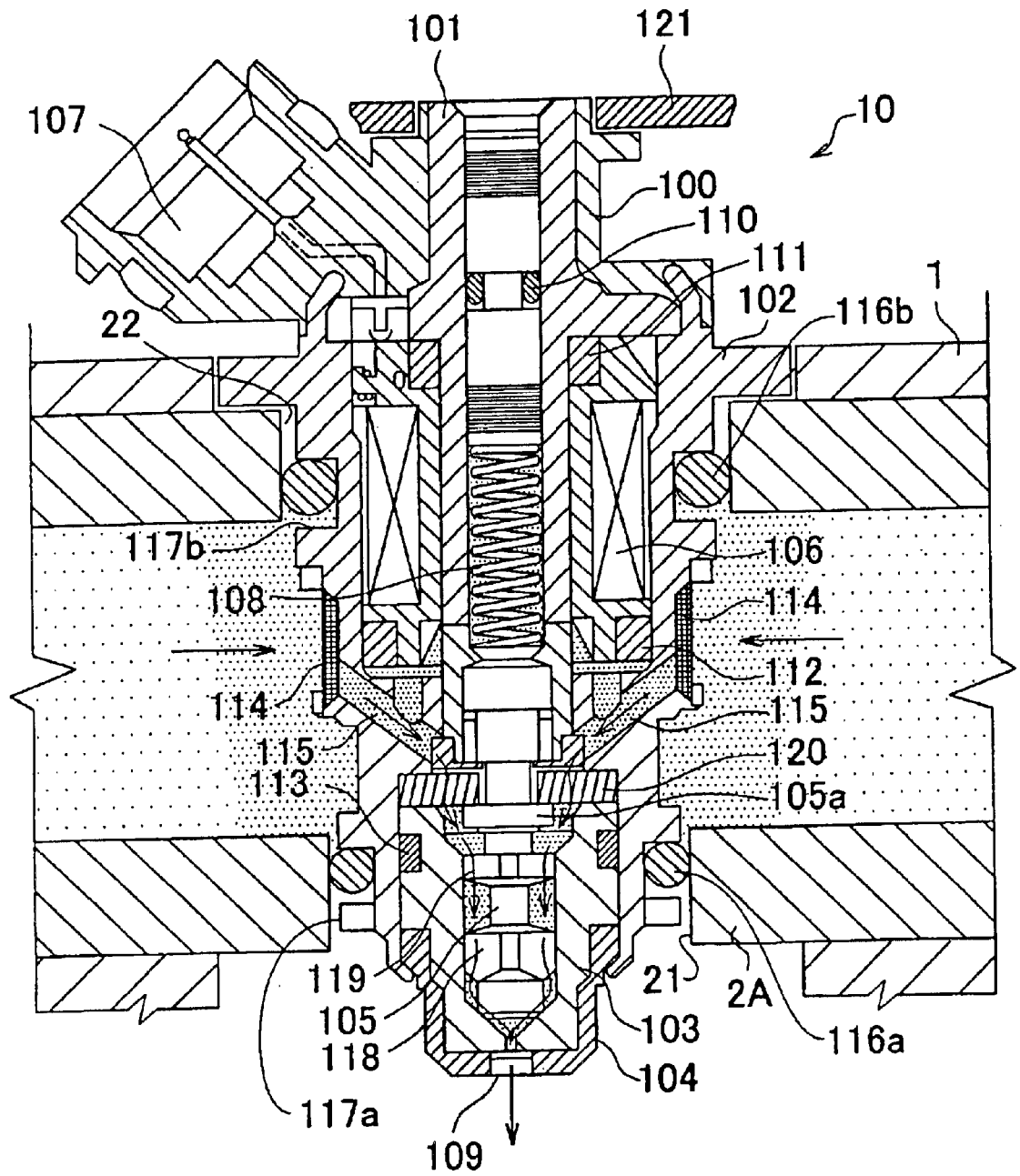
FIG. 3 is an enlarged sectional view showing the portion connecting a fuel passage and an injector in the fuel supply device according to an exemplary embodiment of the invention.

FIG. 3 shows the vicinity of a joint portion of the delivery pipe 2A and the injector 10. The injector 10 intersects almost perpendicularly with the delivery pipe 2A, and the injector 10 penetrates a pair of holes, small hole 21 and large hole 22, that are formed in the delivery pipe 2A. The injector 10 has a needle 105 and an electromagnetic coil 106 in a case formed by several casings 100 through 104. The needle 105 is provided slidably in the case. The electromagnetic coil slides the same needle 105. Also, the casing 100 has a connector installation portion 107 for installing a connector so as to provide electric power to the coil 106. The injector 10 is inserted in an opening portion for installing the cylinder head 1 that communicates with the small hole 21 and the large hole 22, and a flange 102A that is formed in the casing 102 abuts the delivery pipe 2A and determines the position of the insertion direction. The injector 10, after being inserted in the small hole 21 and the large hole 22, is fixed with a clamp member 121 that extends from the cylinder head 1.

The needle 105 is usually maintained by a spring 108, with an injection port 109 at the end of the injector 10 in a closed position. When the fuel is injected, electricity is passed through the coil 106 and a magnetic force is generated, and the needle 105 is transitioned upward in the drawing by the magnetic force. The amount of fuel injected is regulated by the length of time the valve is open. An O-ring 110 through 113 is provided between each casing 100 through 104, and between the casings 100 through 104 and the coil 106, and the fluid-tight conditions in the inner portion of the injector 10 are maintained. In FIG. 3, portions inundated with fuel are shown in stipple.

In a side wall of the injector 10 a fuel receipt port 114 for accepting a supply of fuel is opened. The fuel receipt port 114 is positioned in an inner portion of the delivery pipe 2A when the injector 10 and the delivery pipe 2 are joined. A fuel passage 115 is formed in an inner portion of the injector 110 from the fuel receipt port 114 to the fuel injection port 109. Also, in the fuel receipt port 114, a metallic filter (not shown) is installed so that foreign matter in the fuel will not enter into the inner portion of the injector 10.

The injector 10 of this exemplary embodiment is a so-called side feed type injector. "Side feed type" indicates that the supply of fuel is received from a direction perpendicular to the axis of the injector 10. In contrast to this, an injector that receives the fuel from the axial direction of the injector, in other words, one that receives the fuel from the tail portion of the injector, is called a top feed type. In the exemplary embodiment, by embedding the delivery pipe 2A in the inner portion of the cylinder head 1 and raising the fuel temperature, and, furthermore, by making the injector 10 a side feed type, it is possible to inject the fuel without lowering the temperature of the fuel in the delivery pipe 2A for which was heated.

For example, even if the delivery pipe is embedded in the cylinder head, if the injector is a top feed type, the branch pipes extend into the outer portion of the cylinder head and the temperature of the fuel that was heated will drop. By adopting this embodiment, such fuel temperature drop can be controlled. The advantages of heating the injection fuel will be explained later.

In FIG. 3, a sealing member (O-ring) 116a and 116b are each positioned in the joint portion of the delivery pipe 2A and the injector 10. In other words, the sealing member 116a and 116b disposed on the inner edge of the small hole 21 and the large hole 22 respectively, maintain the fluid-tight conditions between the delivery pipe 2A and the injector 10. Each sealing member 116a and 116b are matched with the shape of the delivery pipe 2A, and positioned on a quadratic surface. Further, each sealing member 116a and 116b are fit into the inside of a groove 117a and 117b that are previously formed on a peripheral surface of the injector 10. By penetrating the injector 10 through the delivery pipe 2A, the injector 10 is positioned in the joint portion of each sealing member 116a and 116b.

Guides 118 and 119 that are positioned on the front edge side of the needle 105 are fixed to the needle 105 and guide the needle 105. The guides 118 and 119 do not obstruct the vertical flow of the fuel. The fuel flows in the direction of the arrows in the drawing. Also, a stopper 120 regulates the vertical distance traveled by the needle 105, i.e., regulates the valve opening distance of the injector 10. In FIG. 3, the front edge of the needle 105 abuts the inner side of the injection port 109, and a guard portion 105a of the needle 105 appears to abut the stopper 120. However, the actual slide amount of the needle 105 is approximately several tens of $\mu$m, and there is a space of the same approximate size between the guard portion 105a and the stopper 120.

The internal diameter of the small hole 21 that is positioned at the front edge side of the injector 10 is smaller than the internal diameter of the large hole 22. Also, the external diameter of the front edge side (joint portion with the small hole 21: sealing member 116a portion) of the injector 10 is smaller than the base end side (joint portion with the large hole 22: sealing member 116b portion). Therefore, when the injector 10 penetrates the delivery pipe 2A, the sealing member 116a of the front edge side does not come in contact with the large hole 22 until adhering with the small hole 21, and the injector 10 is smoothly inserted into the delivery pipe 2A. Until each sealing member 116a and 116b also reaches a predetermined location, there is no misalignment.

Because the cylinder head 1 may be manufactured by casting, casting pores (fine concavities from the casting) are formed on the surface. Therefore, if fuel passages are directly formed in the internal portion of the cylinder head 1, and the injector intersects and penetrates the fuel passage, it becomes difficult to ensure the fluid-tight conditions of the joint portions between them. In particular, for an in-cylinder direct injection type gasoline engine and a diesel engine of the embodiment as described above, because fuel pressure immediately before injection is high, it is even more difficult to ensure the fluid-tight conditions.

According to an exemplary embodiment of the invention, a fuel passage in the cylinder head 1 is formed by embedding the delivery pipe 2A as a different member from the cylinder 1. By sealing between the delivery pipe 2A and the injector 10 with the seal members 116a and 116b, it is possible to reliably achieve the liquid-tight conditions and achieve a fuel supply device that will not leak fuel. Because the delivery pipe 2A is provided as a different member from cylinder head 1, reliable sealing is conducted without any casting pores on the surface.

According to the exemplary embodiment, the delivery pipe 2A is formed as a portion of the fuel passage in the inner portion of the cylinder head 1 that easily absorbs heat generated by the engine. The fuel is injected from each injector 10 after passing through the delivery pipe 2A. By heating the fuel until the time of injection, the atomization of the fuel after injection is promoted. If the atomization of the fuel after injection is good, then good combustion can be reliably carried out, and the components of the exhaust gas that need to be purified are also reduced, and fuel consumption is also improved.

Because fuel temperature is low immediately after a cold start, heating the fuel in this manner is an extremely efficient means for improving driving stability, exhaust gas purification performance and fuel consumption performance. Also, according to the exemplary embodiment, because heat generated by the engine that is usually wasted is used instead of using a unit that consumes energy, such as an electric heater, it is also good for energy efficiency.

Furthermore, according to the exemplary embodiment, because the delivery pipe 2A and the injector 10 intersect and the fuel is fed from the side, decreases in the fuel temperature are prevented, and the above mentioned effects are reliably obtained. Additionally, because the fuel passage in the cylinder 1 is formed as the delivery pipe 2A is different from the cylinder head 1, and sealing member 116a and 116b are positioned on the joint portion of the delivery pipe 2 and the injector 10, reliable fluid-tight conditions are achieved in the fuel system.

Figure 4:
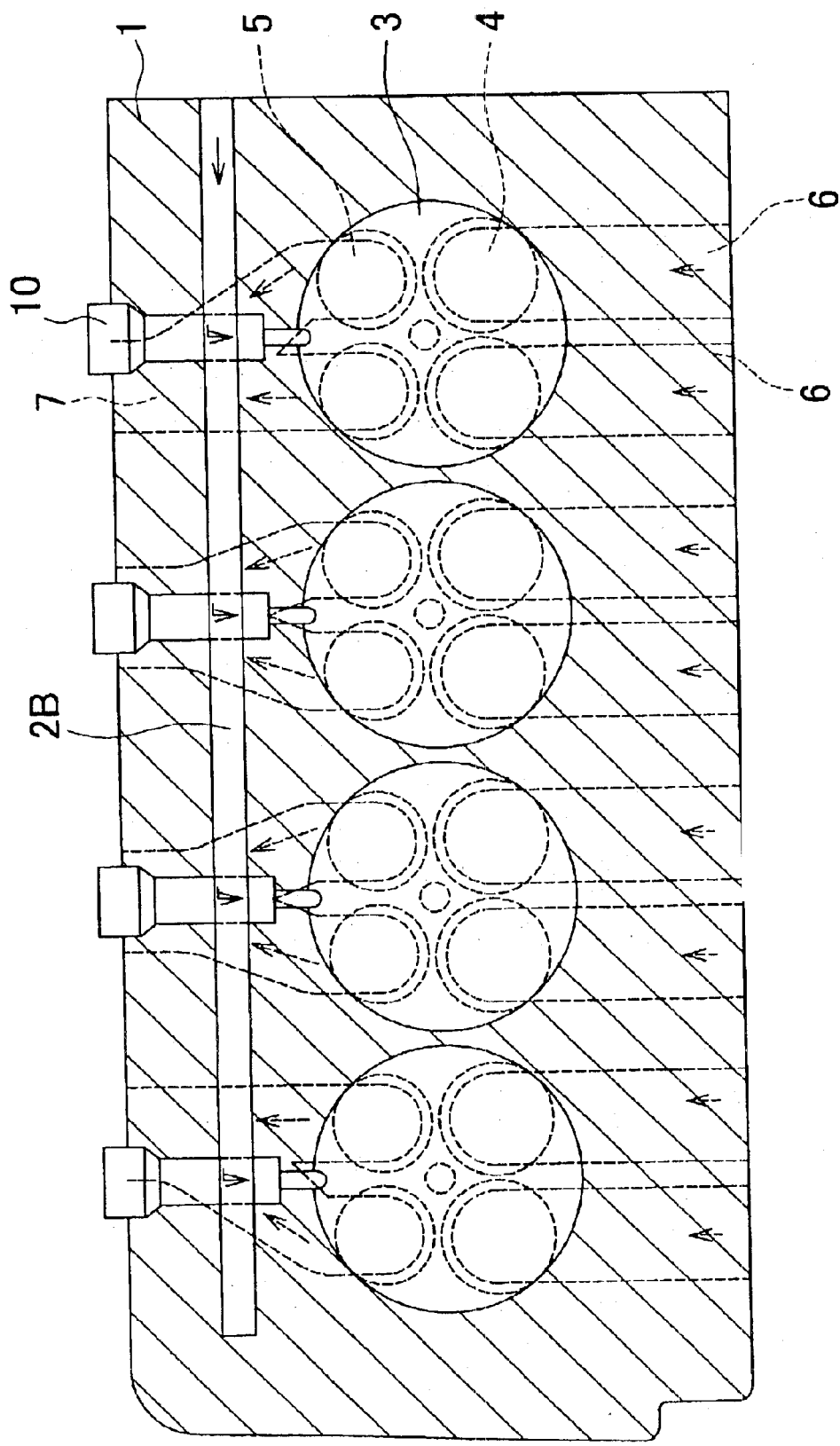
FIG. 4 is a sectional view of a cylinder head of a fuel supply device according to an exemplary embodiment of the invention.

A fuel supply device according to another exemplary embodiment of the invention will be explained below using FIG. 4. In a delivery pipe 2B in the cylinder head 1 is positioned on the exhaust passage side of the cylinder 3, the amount of heat absorbed by the fuel in the delivery pipe 2B from the cylinder head 1 increases. Thus, the atomization of the fuel after injection can be promoted more efficiently, and the exhaust gas purification performance and the fuel consumption performance are effectively improved.

Figure 5:
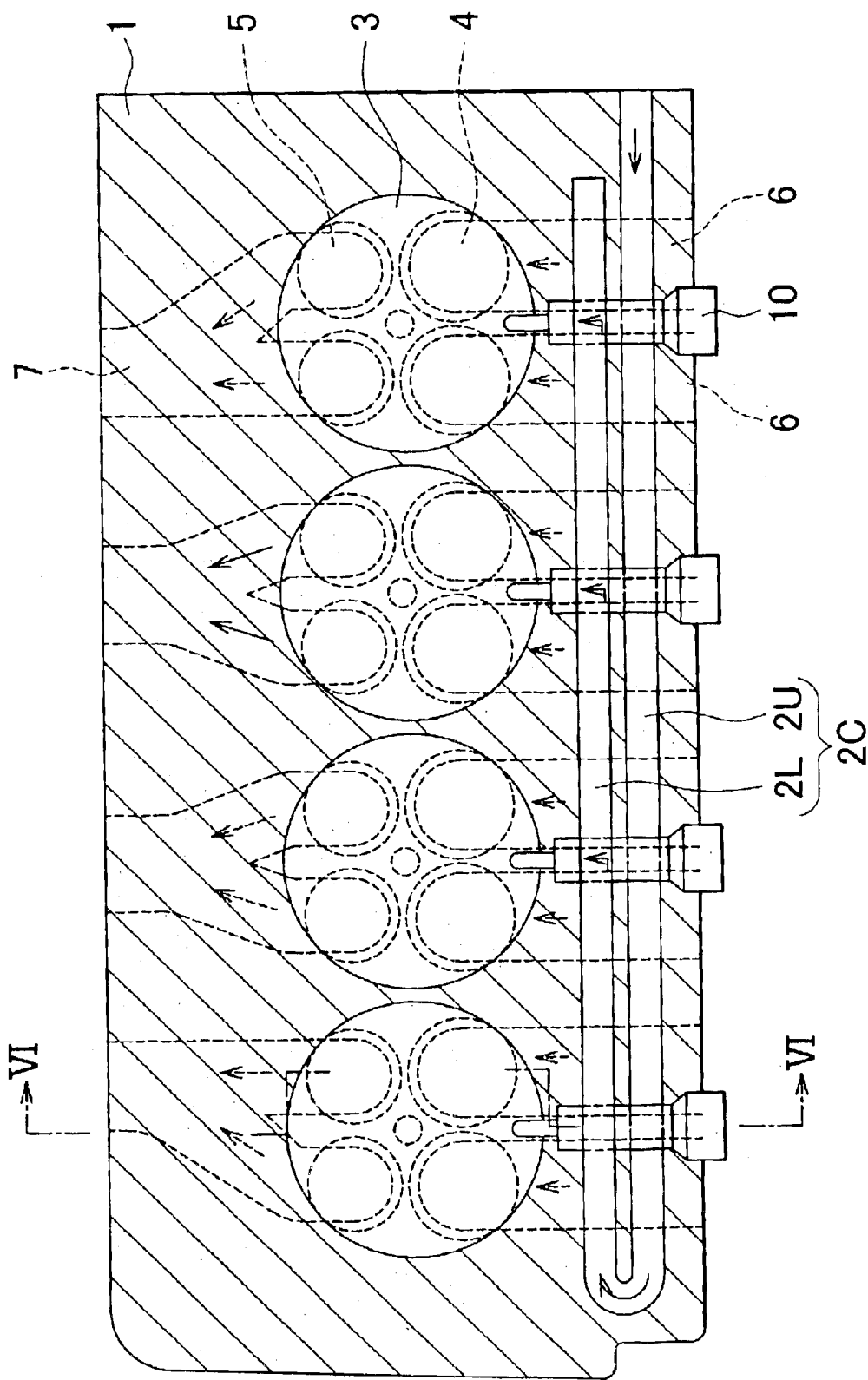
FIG. 5 is a sectional view of a cylinder head of a fuel supply device according to an exemplary embodiment of the invention.
Figure 6:
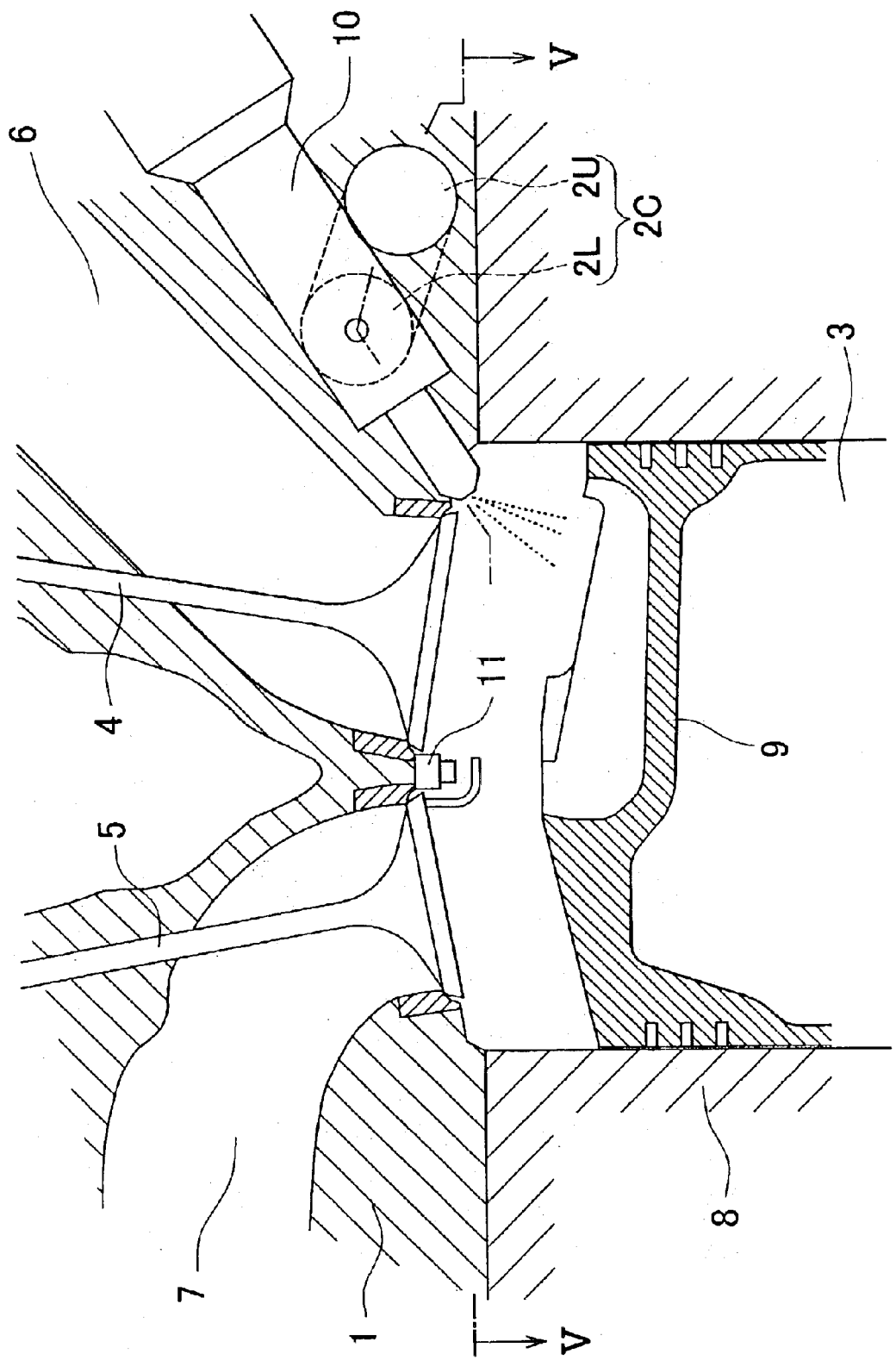
FIG. 6 is a sectional view of the cylinder of the fuel supply device according to an exemplary embodiment of the invention.

A fuel supply device according to another exemplary embodiment of the invention will be explained below. The same numbers are used to indicate members that have the same structures as in the first exemplary embodiment. First, a sectional view of a portion of the cylinder head 1 of an internal combustion engine (engine) that has a fuel supply device according to the third embodiment is shown in FIG. 5 and FIG. 6. In FIG. 5, a sectional view of a plane perpendicular to the central axis of the cylinder 3 is shown. In FIG. 6, a sectional view of a plane that passes through the central axis of the cylinder 3 is shown. FIG. 5 is a sectional view taken along line V to V in FIG. 6, and FIG. 6 is a sectional view taken along line VI to VI in FIG. 5.

As shown in FIG. 5, a fuel passage 2C that is positioned in the cylinder 1 of the third embodiment forms a U-shaped route. The fuel passage 2C can be formed by casting a U-shaped pipe when the cylinder 1 is cast. Also, the fuel passage 2C can be formed by forming a ventricular passage when the cylinder head 1 is cast. In the exemplary embodiment, a different pipe is cast when the cylinder head 1 is cast, and the fuel passage 2C is formed (hereinafter, the fuel passage 2C in the cylinder head 1 is referred to also as the delivery pipe 2C).

Though not shown in the drawing, when the fuel pressure in the delivery pipe 2C increases beyond a predetermined value, a return pipe is also provided that makes the fuel in the fuel passage 2C flow back to the upstream side in order to lower fuel pressure.

The delivery pipe 2C is introduced into the inside of the cylinder head 1 from a side (right side in FIG. 5) of the cylinder 1 (hereinafter, this portion is referred to as an upstream portion 2U), and U-turns at the other side (left side in FIG. 5) of the cylinder 1 and extends to the vicinity of the aforementioned side (hereinafter, this portion is referred to as an downstream portion 2L). According to the exemplary embodiment, both the upstream portion 2U and the downstream portion 2L are positioned in the intake passage side of the cylinder 3, i.e., the side where the intake valve 4 and the intake port 6 are positioned. Each injector 10 is directly connected to the downstream portion 2L (refer to FIG. 6). Because the conditions of the joint portion between the delivery pipe 2C and the injector 10 are the same as described above, a detailed explanation is omitted.

According to the exemplary embodiment, because the fuel passage (delivery pipe) 2C is formed in the interior portion of the cylinder head 1 that is heated by the heat generated by the engine, the fuel is heated prior to injection and the atomization of the fuel after injection can thus be promoted. Therefore, similar results as those described in the first exemplary embodiment may be obtained.

Further, according to this exemplary embodiment, after the fuel passage 2C makes a U-turn in the cylinder head 1, it connects to each injector 10. Therefore, the route for the fuel from the entrance of the delivery pipe 2C that is embedded in the internal portion of the cylinder head 1 to the injector 10 is increased. In other words, because the fuel flows for a longer time within the cylinder head 1, the fuel can absorb even more heat before being injected, and the injection fuel temperature for each cylinder 3 is equalized.

The fuel temperature increases rapidly at first when the fuel begins absorbing heat inside the cylinder head, but the rate of increase gradually lessens and finally the fuel reaches a constant temperature (assuming that the engine temperature is constant). The fuel passage 2C of the inner portion of the cylinder 1 is formed into a U-shape, and, therefore, the temperature gradient of the downstream portion 2L decreases or ceases to occur, even if the temperature gradient in the upstream portion 2U is large.

Figure 7:
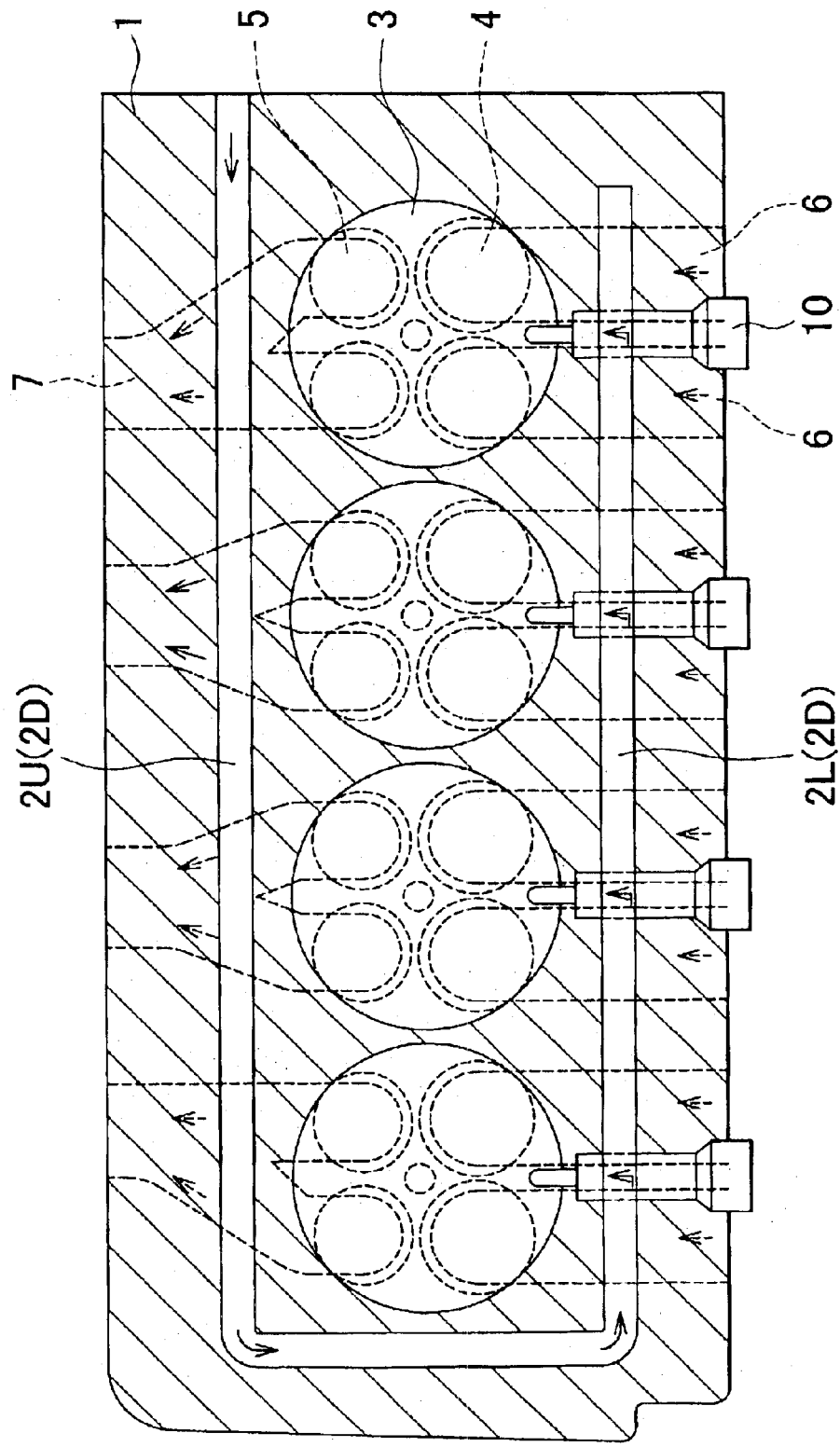
FIG. 7 is a sectional view of a cylinder head of a fuel supply device according to an exemplary embodiment of the invention.
Figure 8:
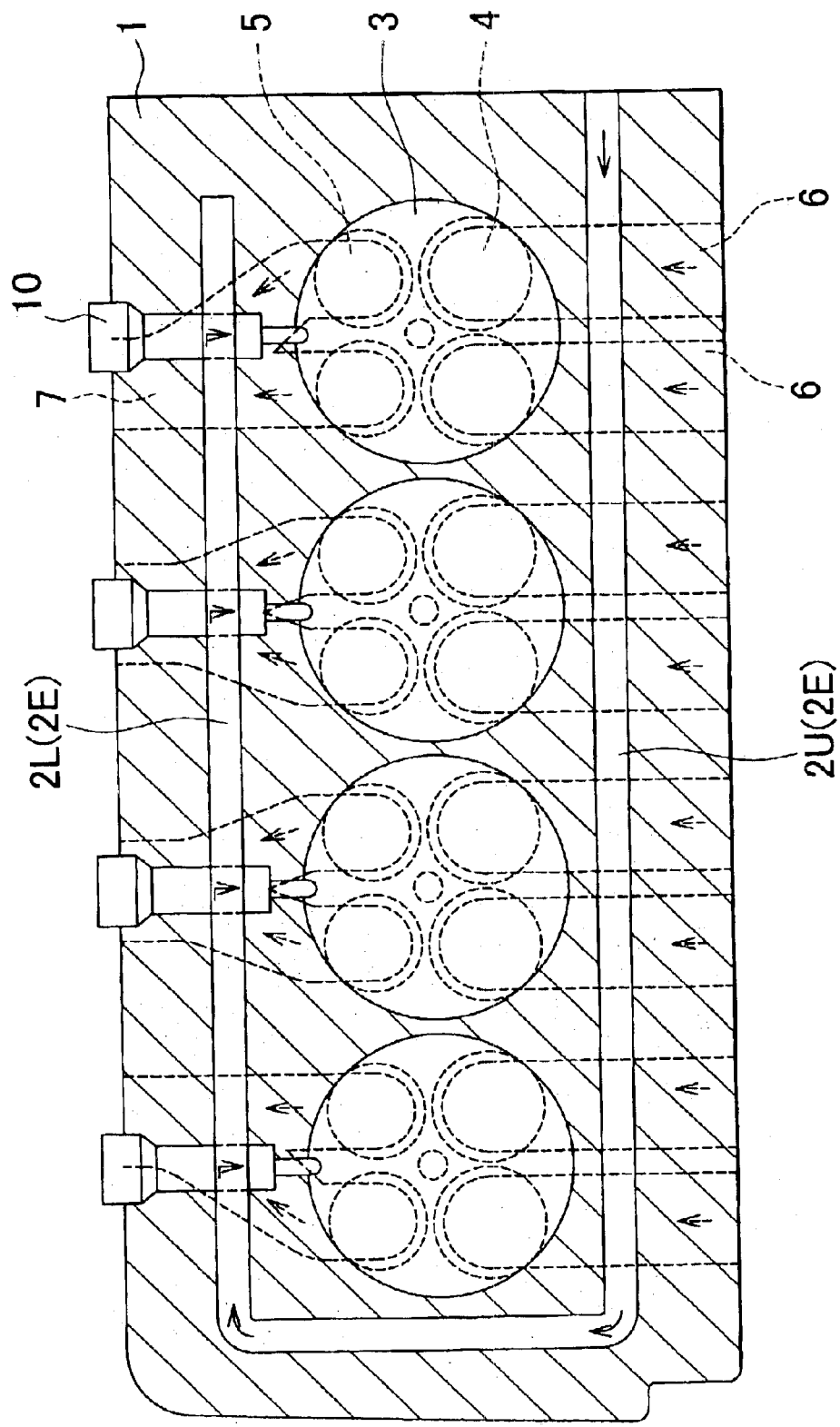
FIG. 8 is a sectional view of a cylinder head of a fuel supply device according to an exemplary embodiment of the invention.
Figure 9:
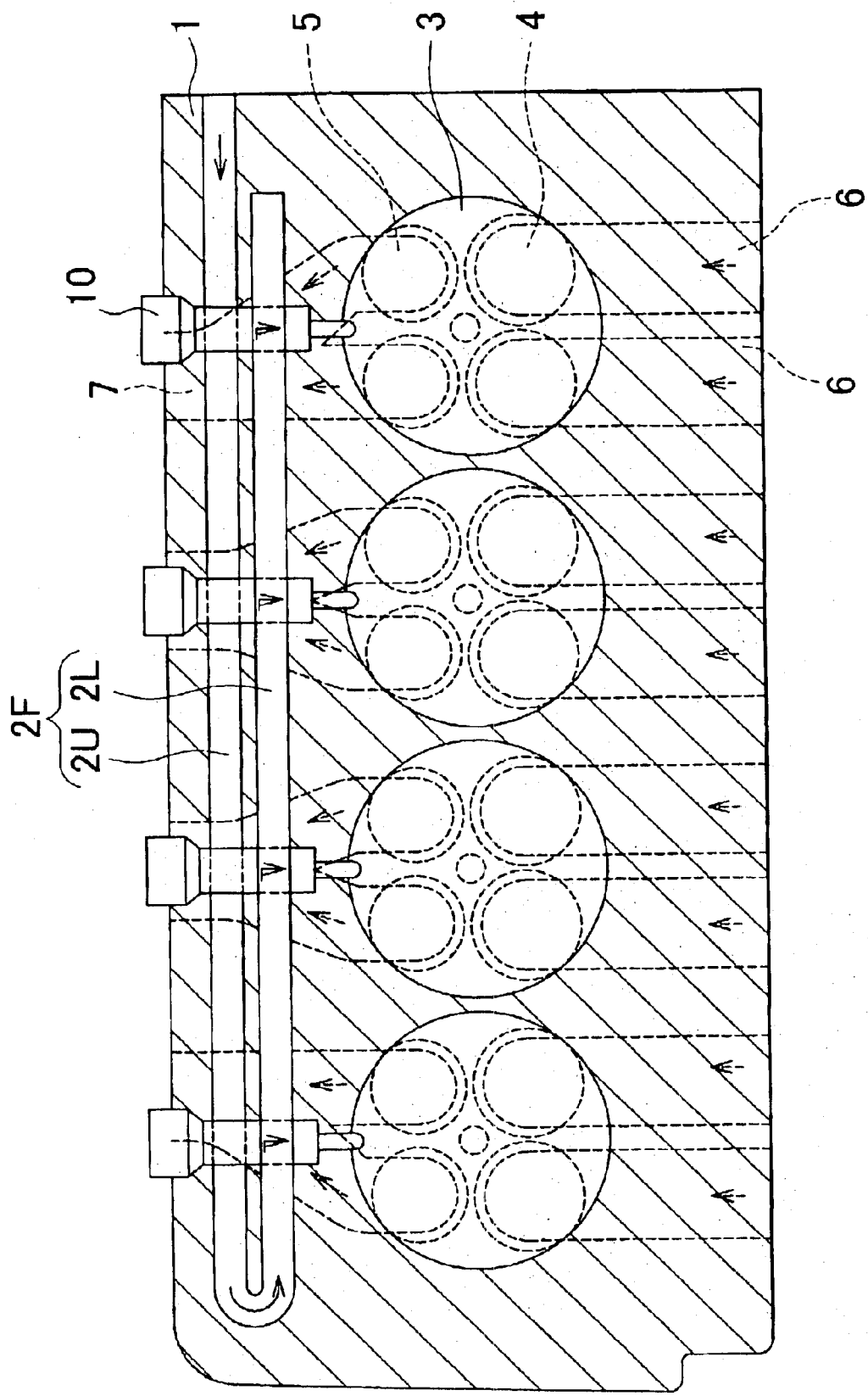
FIG. 9 is a sectional view of a cylinder head of a fuel supply device according to an exemplary embodiment of the invention.

Further, according to this exemplary embodiment, both the upstream portion 2U and the downstream portion 2L of the fuel passage 2C are positioned on the intake passage side. Concerning the positioning of the upstream portion 2U and the downstream portion 2L, there are different benefits to placing them on the intake passage side or on the downstream passage side, and each of these benefits is explained below. Further, the optimum form may be selected after taking into consideration the various benefits explained hereafter. The drawings of other exemplary embodiments, which are similar to FIG. 1, are shown in FIGS. 7–9. The structural portions that are the same or equivalent to those in the first exemplary embodiment shown in FIG. 1 will be denoted by the same reference numerals.

According to the exemplary embodiment, the benefits when the upstream portion 2U and the downstream portion 2L of the fuel passage 2C are positioned on the intake passage side will be explained. By positioning the upstream portion 2U and the downstream portion 2L on the intake passage side, the fuel in the fuel passage 2C (the upstream portion 2U and the downstream portion 2L) can be heated using the heat generated by the engine. Simultaneously, the temperature of the intake passage side of the cylinder head 1 can be lowered. This is because the heat stored in the cylinder head 1 is absorbed by the fuel in the fuel passage 2. As a result, the charging efficiency of the air that is injected into the inner portion of the cylinder 3 via the intake passage can be improved, thus contributing to increased engine output.

Next, as shown in FIG. 7, an exemplary embodiment that positions the upstream portion 2U on the exhaust passage side of the cylinder 3 and the downstream portion 2L on the intake passage side will be explained. According to the exemplary embodiment, by the formation of a fuel passage 2D (the upstream portion 2U is on the exhaust passage side, and the downstream portion 2L is on the intake portion side), because the fuel is heated in the upstream portion 2U that is positioned on the exhaust passage side where the temperature is high even inside the cylinder head 1, the fuel is efficiently heated. By improving the heating efficiency, the atomization of the fuel after injection is further promoted, and as a result, the further improvement of the exhaust gas purification performance and the fuel consumption performance is achieved.

Also, because the upstream portion 2U that has a low fuel temperature inner portion is positioned on the side of the cylinder head 1 that has a high temperature, the exhaust passage side of the cylinder head 1 is effectively cooled. This is because the heat stored in the exhaust passage side of the cylinder head 1 is absorbed by the fuel in the upstream portion 2U. As a result, the temperature gradient between the exhaust passage side and intake passage side of the cylinder head 1 itself can be lessened, and it is possible for the temperature gradient of the entire cylinder 1 to approach a more equalized state. If the temperature of the entire cylinder head 1 is further equalized, because the temperature gradient inside the combustion chamber becomes smaller, knocking, and the like, can be suppressed.

Next, as shown in FIG. 8, an exemplary embodiment in which the upstream portion 2U is positioned on the intake passage side and the downstream portion 2L is position on the exhaust passage side will be discussed. According to the exemplary embodiment, by the formation of a fuel passage 2E (the upstream portion 2U is on the intake passage side, and the downstream portion 2L is on the exhaust passage side), the above mentioned benefits of the third exemplary embodiment and the benefits of the fourth exemplary embodiment are realized in a balanced manner. In other words, by positioning the upstream portion 2U on the intake passage side, the cooled fuel cools the intake passage side of the cylinder head 1, and the charging efficiency of the air that is injected into the cylinder 3 can be improved. Also, at the same time, by positioning the downstream portion 2L on the exhaust passage side, the heating efficiency of the fuel is improved, and the atomization of the fuel after injection is further improved. By further improving the atomization of the fuel after injection, the further improvement of the exhaust gas purification performance and the fuel consumption performance is achieved.

Next, as shown in FIG. 9, an exemplary embodiment in which both the upstream portion 2U and the downstream portion 2L are positioned on the exhaust passage side will be explained. According to the exemplary embodiment, by the formation of a fuel passage 2F (the upstream portion 2U and the downstream portion 2L are on the exhaust passage side), the heating efficiency of the fuel will be the most advantageous. By promoting the atomization of the fuel after injection, the further improvement of the exhaust gas purification performance and the fuel consumption performance is achieved. Also, the temperature gradient between the exhaust passage side and the intake passage side of the cylinder 1 is lessened, and as mentioned above knocking, and the like, may be suppressed.

Figure 10:
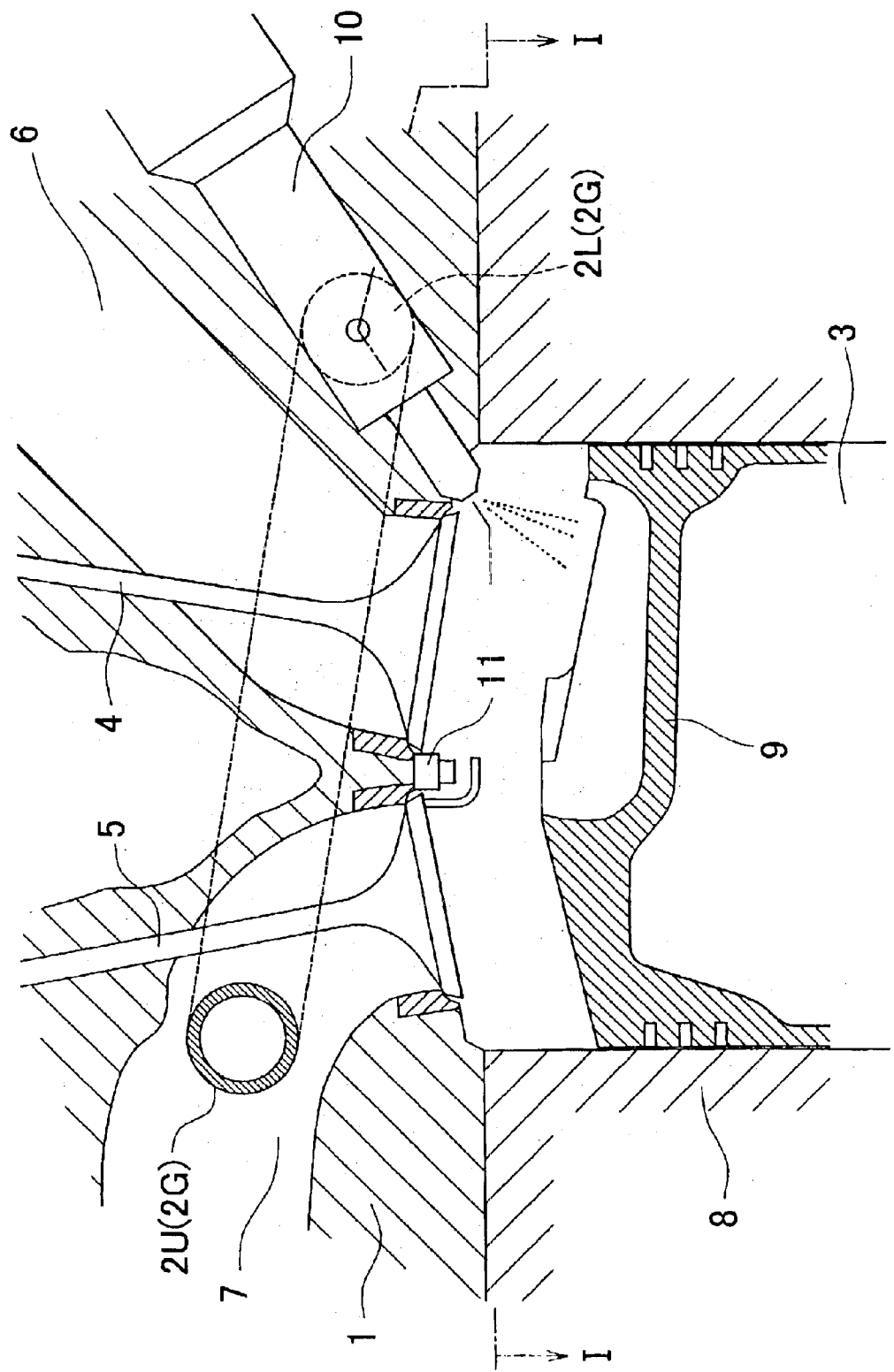
FIG. 10 is a sectional view of a cylinder of a fuel supply device according to an exemplary embodiment of the invention.

Furthermore, the upstream portion 2U of a delivery pipe 2G, according to another exemplary embodiment, as shown in FIG. 10, can be positioned so that it intersects an exhaust port 7. By doing so, the delivery pipe 2G directly absorbs the heat from the high temperature exhaust gas, and the fuel is heated more efficiently.

The fuel supply device of this invention improves the exhaust gas purification performance and the fuel consumption performance by preheating the fuel that will be combusted, which promotes the atomization of the fuel at the time the fuel is injected into the intake port and cylinder. Although the concept of heating the injected fuel has been known, in the invention the fuel is efficiently heated using the heat generated by the engine (internal combustion engine) without using electric energy, or the like. Therefore, according to an exemplary embodiment of the invention, one portion of the fuel passage is formed in the cylinder head, and by heating the fuel in the fuel passage using the heat generated by the engine, the heated fuel is injected into the cylinder (or intake port, etc.) without being cooled.

According to the exemplary fuel supply device that is an aspect of the invention, the improvement of each performance can be achieved through reliable combustion by heating the fuel with the delivery pipe that is embedded in the cylinder head and thus promoting the atomization of the fuel after injection. Also, by embedding the delivery pipe in the cylinder head and then positioning a sealing member on the joint portion between the delivery pipe and the fuel injection valve, it is possible to secure reliable fluid-tight conditions in the fuel system.

According to the exemplary fuel supply device that is an aspect of the invention, it is possible to promote the atomization of the fuel after injection by heating the fuel until the time of injection by injecting the fuel from the fuel injection valve after it passes through the fuel passage (delivery pipe) in the cylinder head. If the atomization of the fuel after injection is good, then good combustion can be reliably carried out, and the components of the exhaust gas that need to be purified are reduced, and fuel consumption is improved. Because heat generated by the engine that is usually wasted is used rather than a unit that consumes energy, such as an electric heater, the invention is preferable also for energy efficiency.

Furthermore, after the fuel passage makes a U-turn in the cylinder head, it connects with the fuel injection valve, and the fuel can therefore absorb more heat until it is injected. In the case of multiple fuel injector valves, the temperature of the injected fuel is approximately equal for each cylinder.

The exhaust gas performance and the fuel consumption performance, as well as energy efficiency, can be improved by promoting atomization of the fuel by injecting the fuel after it passes through the fuel passage in the cylinder head. Furthermore, because the fuel passage is positioned on the exhaust passage side in the cylinder head, the heating efficiency of the fuel in the fuel passage is good, and the improvement of the exhaust gas purification performance and the fuel consumption performance is carried out even more efficiently as a result of the heating of the fuel.

Further, the fuel supply device of the invention is not limited to the above-mentioned embodiments. For example, the above-mentioned embodiments are explained for use in an in-cylinder injection type gasoline engine, but the embodiments are also applicable for a diesel engine or a gasoline engine other than an in-cylinder injection type engine. Also, in a diesel engine, etc. the delivery pipe is often referred to as a common rail.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. A fuel supply device for an internal combustion engine having at least one cylinder that is formed in a cylinder block and a cylinder head that is joined to an upper portion of the cylinder block, the fuel supply device comprising:

a delivery pipe that is composed of a member different from the cylinder head and is embedded in the cylinder head;

a fuel injection valve for injecting fuel into one of the at least one cylinder and an intake passage that communicates to the cylinder, the fuel injection valve penetrating the delivery pipe through a hole formed in the delivery pipe; and an annular sealing member that is provided along the periphery of the hole of the delivery pipe to seal between the delivery pipe and the fuel injection valve.

2. The fuel supply device according to claim 1, wherein the delivery pipe further comprises:

a first pipe portion that is introduced into the cylinder head from a first side of the cylinder head and is formed in a straight line;

a U-turn portion that continues from the first pipe portion and U-turns at an end of the first pipe portion; and a second pipe portion that continues from the U-turn portion and is structured in a straight line.

3. The fuel supply device according to claim 2, wherein the first pipe portion and the second pipe portion are positioned on an intake passage side of the cylinder.

4. The fuel supply device according to claim 3, wherein the fuel injection valve is connected to the first pipe portion.

5. The fuel supply device according to claim 3, wherein the fuel injection valve is connected to the second pipe portion.

6. The fuel supply device according to claim 2, wherein the first pipe portion is positioned on an exhaust side of the cylinder, and the second pipe portion is positioned on an intake passage side of the cylinder.

7. The fuel supply device according to claim 6, wherein the fuel injection valve is connected to the first pipe portion.

8. The fuel supply device according to claim 6, wherein the fuel injection valve is connected to the first pipe portion.

9. The fuel supply device according to claim 2, wherein the first pipe portion is positioned on an intake passage side of the cylinder, and the second pipe portion is positioned on an exhaust side of the cylinder.

10. The fuel supply device according to claim 9, wherein the fuel injection valve is connected to the first pipe portion.

11. The fuel supply device according to claim 9, wherein the fuel injection valve is connected to the second pipe portion.

12. The fuel supply device according to claim 2, wherein the first pipe portion and the second pipe portion are positioned on an exhaust passage side of the cylinder.

13. The fuel supply device according to claim 2, wherein the fuel injection valve is connected to the first pipe portion.

14. The fuel supply device according to claim 12, wherein the fuel injection valve is connected to the second pipe portion.

15. The fuel supply device according to claim 2, wherein the first pipe portion of the delivery pipe intersects with at least one of the intake port and the exhaust port that are formed in the cylinder head.

16. The fuel supply device according to claim 1, wherein the delivery pipe is embedded in an exhaust passage side of the cylinder head.

* * * * *